United States Patent

Hoogendoorn et al.

[19]

[11] Patent Number: 5,912,637

[45] Date of Patent: Jun. 15, 1999

[54] MAGNETIC RECORDING METHOD AND APPARATUS WHICH PROVIDE AT LEAST TWO WRITE PULSES FOR EACH BINARY SIGNAL BIT TO BE RECORDED

[75] Inventors: Abraham Hoogendoorn; Willem A. Roos; Johannes J. W. Kalfs, all of Eindhoven, Netherlands

[73] Assignee: U.S. Philips Corporation, New York, N.Y.

[21] Appl. No.: 08/744,801

[22] Filed: Nov. 6, 1996

[30] Foreign Application Priority Data

Nov. 8, 1995 [EP] European Pat. Off. .............. 95203029

[51] Int. Cl.$^6$ ....................................................... G11B 5/09
[52] U.S. Cl. .................................. 341/58; 360/40; 341/70
[58] Field of Search ................................. 341/58, 70, 71, 341/72, 73; 360/40

[56] References Cited

U.S. PATENT DOCUMENTS

| | | | |
|---|---|---|---|
| Re. 33,356 | 9/1990 | Tanaka et al. ............................ | 341/72 |
| 3,274,611 | 9/1966 | Brown et al. ............................. | 341/57 |
| 3,418,631 | 12/1968 | Sipress et al. ........................... | 341/57 |
| 4,186,375 | 1/1980 | Castellani et al. ....................... | 360/40 |
| 4,337,457 | 6/1982 | Tache ...................................... | 341/71 |
| 4,965,873 | 10/1990 | White ..................................... | 360/41 |
| 5,144,469 | 9/1992 | Brahms et al. .......................... | 341/73 |

FOREIGN PATENT DOCUMENTS 57181420  11/1982  Japan  ................................ G11B 5/09

*Primary Examiner*—Marc S. Hoff
*Attorney, Agent, or Firm*—Steven S. Rubin

[57] ABSTRACT

A method and an apparatus are disclosed for recording a binary signal onto a magnetic record carrier. The binary signal is supplied to an input terminal. The apparatus comprise generators for generating at least two write pulses ($P_1$,$P_2$) for each bit of the binary signal to be written. More specifically, the generators are adapted to (i) generate at least two write pulses of a third polarity for the first bit of the first polarity in the first sequence, (ii) generating a write pulse of the third polarity and a write pulse of a fourth polarity for the at least second bit of the first polarity occurring in the first sequence, the third polarity being opposite to the fourth polarity, (iii) generating at least two write pulses of the fourth polarity for the first bit of the second polarity in the second sequence, (iv) generating a write pulse of the third polarity and a write pulse of the fourth polarity for the at least second bit of the second polarity occurring in the second sequence.

21 Claims, 3 Drawing Sheets

MAGNETIC RECORDING METHOD AND APPARATUS WHICH PROVIDE AT LEAST TWO WRITE PULSES FOR EACH BINARY SIGNAL BIT TO BE RECORDED

BACKGROUND OF THE INVENTION

1. Field of the Invention

The invention relates to a method of recording a binary signal onto a magnetic record carrier, the method comprises the steps of:

a) receiving the binary signal, the binary signal comprising bits of a first polarity and bits of second polarity, the second polarity being opposite to the first polarity, (b) writing bits of the first and the second polarity onto the record carrier, and relates to an apparatus for recording the binary signal onto the record carrier. A method and apparatus as defined above is known from JP Kokai 57-181,420.

2. Discussion of the Related Art

In the known method, a binary signal is recorded by generating write pulses at the location of leading and tailing edges of the binary signal, in order to decrease recording current and to avoid a too large current consumption and thus an overheating of the write head.

SUMMARY OF THE INVENTION

The invention aims at improving the writing of a binary signal. The method in accordance with the invention is characterized in that the writing step comprises the step of generating at least two write pulses for each bit to be written, and that, when writing a first sequence of at least two bits of the first polarity followed by a second sequence of at least two bits of the second polarity, the writing step comprising the substeps of (i) generating at least two write pulses of a third polarity for the first bit of the first polarity in the first sequence, (ii) generating a write pulse of the third polarity and a write pulse of a fourth polarity for the at least second bit of the first polarity occurring in the first sequence, the third polarity being opposite to the fourth polarity, (iii) generating at least two write pulses of the fourth polarity for the first bit of the second polarity in the second sequence, (iv) generating a write pulse of the third polarity and a write pulse of the fourth polarity for the at least second bit of the second polarity occurring in the second sequence.

The invention is based on the following recognition. First, a write equalization is carried out during recording of a binary signal. More specifically, when writing a second or further bit of the first polarity (a '1' bit) in a sequence of bits of the first polarity to be written on the record carrier, a first write pulse of the second polarity (a negative write pulse) is generated, followed by a write pulse of the first polarity (a positive write pulse). In an identical way, when writing a second or further bit of the second polarity (a '0' bit) in a sequence of bits of the second polarity to be written on the record carrier, a first write pulse of the first polarity (a positive write pulse) is generated, followed by a write pulse of the second polarity (a negative write pulse). This results in a low frequency content of the signal written in the record carrier. Further, equalization during reproduction becomes easier.

As a second measure, when writing the first bit of the first polarity (a '1' bit) in the sequence of bits of the first polarity to be written on the record carrier, two write pulses of the first polarity (two positive write pulses) are generated. In an identical way, when writing the first bit of the second polarity (a '0' bit) in the sequence of bits of the second polarity to be written on the record carrier, two write pulses of the second polarity (two negative write pulses) are generated. Further, when single bits of the first polarity directly surrounded by bits of the second polarity are to be written, normally, only one write pulse of the first polarity is generated for each bit of the first polarity. In accordance with the present invention, however, two write pulses of the first polarity (two positive write pulses) are generated. Moreover, when single bits of the second polarity directly surrounded by bits of the first polarity are to be written, normally, only one write pulse of the second polarity is generated for each bit of the second polarity. In accordance with the invention, however, two write pulses of the second polarity (two negative write pulses) are generated. The reason for this is the following.

Suppose a long sequence of bits of the first polarity. As has been explained above, for the second and further bits in the sequence to be written, two pulses of opposite polarity are generated for each bit. In a long sequence of subsequent bits of opposite polarity (. . . 0101010 . . .), in accordance with the prior art only one write pulse need to be generated for each bit. As a result, there is a large difference in dissipation, as for the long sequence of bits of the first polarity a writing power of a factor of 2 greater is needed than for the long sequence of subsequent bits of opposite polarity. Those variations in dissipation, in dependence of the signal to be written, results in a thermical crosstalk between the write head and a read head in a combined read-write head construction. Such read-write head construction can be used to realize a read-while-write or a read-after-write function, or to realize a tracking function. The variations in dissipation result in a distortion component in the signal read out by the read head, so that read-after-write, read-while-write or tracking functions less properly.

By generating two write pulses of the same polarity for the first bit of the first polarity in the sequence of bits of the first polarity and for each bit in a sequence of bits of subsequently opposite polarity, the power dissipation remains substantially the same, resulting in practically no distortion in the signal read out.

BRIEF DESCRIPTION OF THE DRAWINGS

These and other aspects of the invention will be apparent from and elucidated with reference to embodiments described hereafter and shown in the following Figures wherein.

DETAILED DESCRIPTION OF THE PREFERRED EMBODIMENTS OF THE INVENTION

Figure 1:
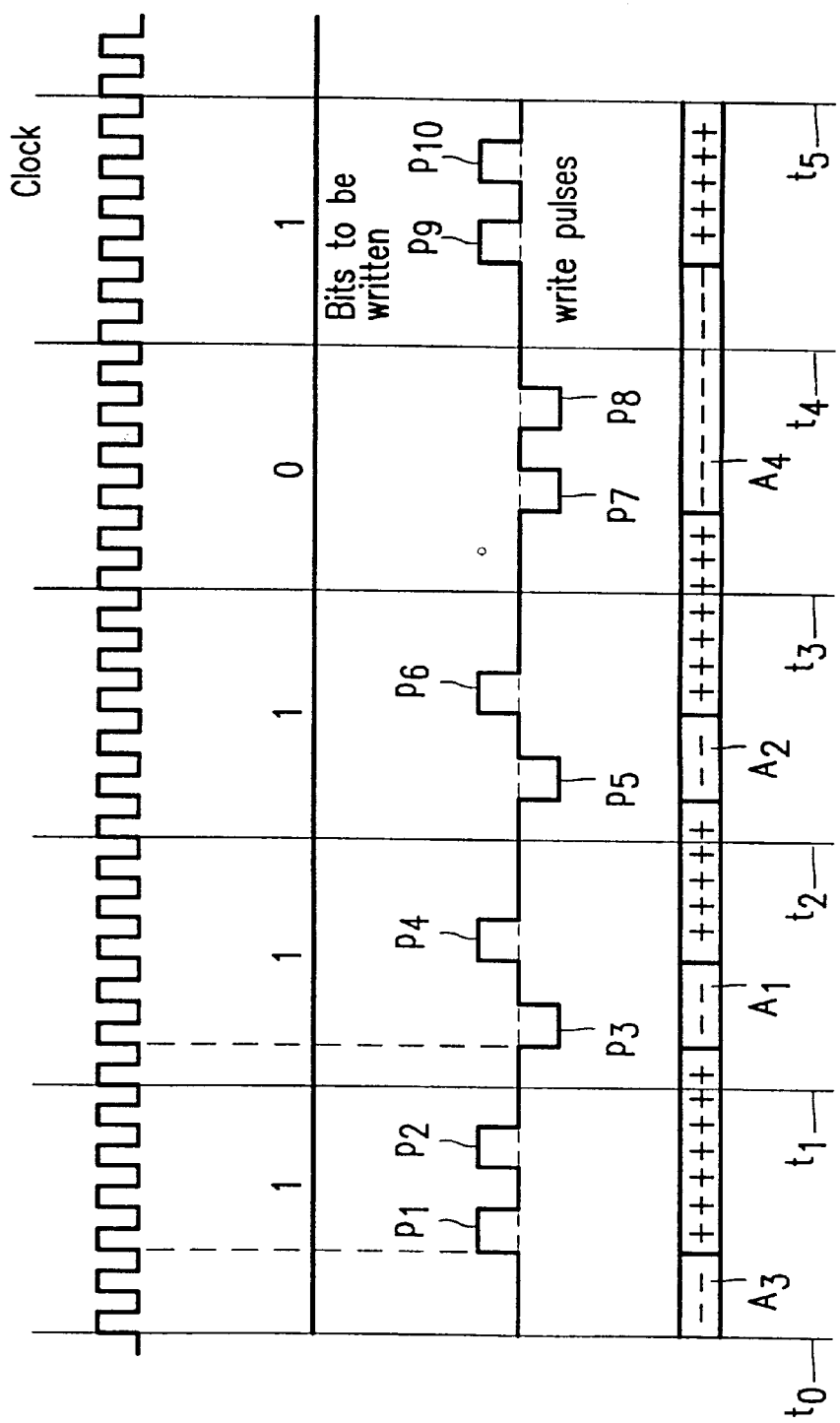
FIGS. 1a to 1d show an embodiment of the method of recording a binary signal.

The signal in FIG. 1a is a clock signal which is applied to a writing apparatus in accordance with the invention and to be described hereafter. FIG. 1b is an example of a binary signal which is to be written on a record carrier. FIG. 1c is the write current by which the binary signal will be written on the record carrier. FIG. 1d shows the magnetic pattern in a track on a record carrier in which the binary signal of FIG.

1(b) has been written. That signal has a sequence of bits . . . 11101 . . . The bit directly preceding the first '1' bit in FIG. 1b was a '0' bit. This can be concluded from the fact that the magnetisation prior to the first pulse in the time interval $(t_0,t_1)$ is given by minus-signs, see FIG. 1d.

The first '1'-bit in the sequence of three consecutive '1'-bits shown in FIG. 1(b) results in the generation of two positive pulses $P_1$ and $P_2$ in the time interval $(t_0,t_1)$. The subsequent '1'-bit leads to a negative pulse $P_3$ followed by a positive pulse $P_4$ in the time interval $(t_1,t_2)$. The last '1'-bit in the sequence leads again to a negative pulse $P_5$ followed by a positive pulse $P_6$ in the time interval $(t_2,t_3)$. The subsequent '0'-bit leads to two negative pulses $P_7$ and $P_8$ in the time interval $(t_3,t_4)$. Next, comes a '1'-bit which again results in the generation of two positive pulses $P_9$ and $P_{10}$ in the time interval $(t_4,t_5)$.

Prior to the occurrence of the write pulse $P_1$, the magnetisation was in the negative direction, as is shown in FIG. 1d. Upon the occurrence of the pulse $P_1$, the direction of magnetisation changes into the positive direction. The second pulse $P_2$ does not influence the magnetisation pattern on the record carrier but the power dissipation in the write head now remains substantially constant, as has been explained above.

The magnetisation direction reverses upon the occurrence of the pulse $P_3$ and reverses again upon the occurrence of the pulse $P_4$. This is the result of the write equalization described above in order to lower the low frequency contents of the signal written in the record carrier.

The magnetisation direction further reverses upon the occurrence of the pulse $P_5$ and reverses again upon the occurrence of the pulse $P_6$.

Upon the occurrence of the pulse $P_7$, the direction of magnetisation changes into the negative direction. The second pulse $P_8$ again does not influence the magnetisation pattern on the record carrier, but results in a smaller variation in power dissipation. The magnetisation direction changes again upon the occurrence of the pulse $P_9$.

It should be noted that the moment of occurrence of the pulse pairs $(P_1,P_2)$, $(P_7,P_8)$ and $(P_9,P_{10})$ in their corresponding time intervals $(t_0,t_1)$, $(t_3,t_4)$ and $(t_4,t_5)$ respectively, are delayed compared to the moment of occurrence of the pulse pairs $(P_3, P_4)$ and $(P_5,P_6)$ in their corresponding time intervals $(t_2,t_3)$ and $(t_3,t_4)$ respectively. As an example, the rising edge of the pulse $P_1$ in FIG. 1c concurs with the rising edge of the third clock pulse in the time interval $(t_0,t_1)$, whereas the falling edge of the pulse $P_3$ concurs with the rising edge of the second clock pulse in the time interval $(t_1,t_2)$.

More specifically, the rising edge of the pulse $P_1$ in the interval $(t_0,t_1)$ occurs at a time instant in this time interval which lies exactly half way in between the moments of occurrence of the falling edge of the pulse $P_3$ and the rising edge of the pulse $P_4$ in the time interval $(t_1,t_2)$. As a result, the short areas of negative magnetization $A_1$ and $A_2$ in FIG. 1d resulting from the negative pulses $P_3$ and $P_5$, lie symmetically between the large areas of negative magnetization $A_3$ and $A_4$.

Figure 2:
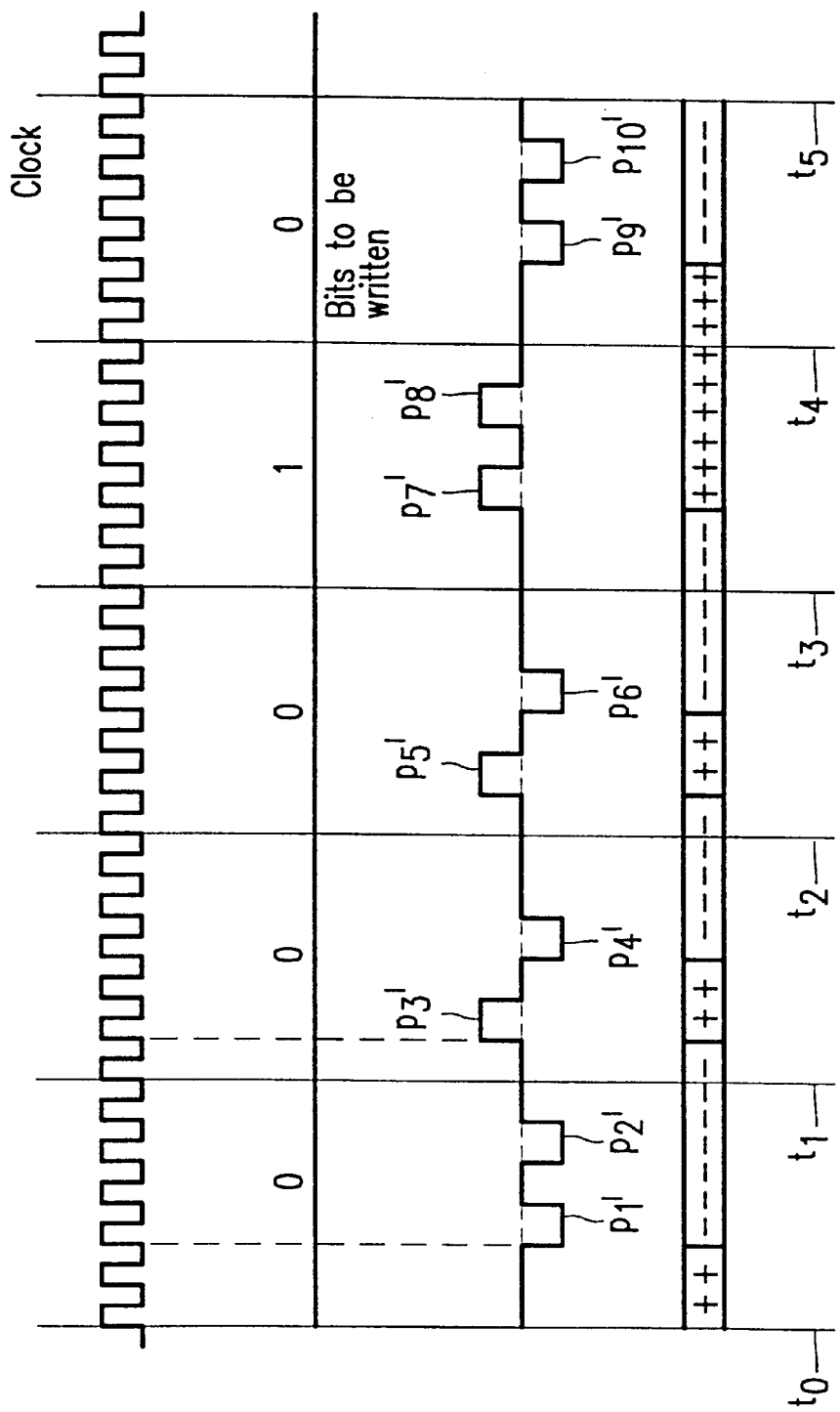
FIGS. 2a to 2d show the method of recording another binary signal.

The signal in FIG. 2b is another example of a binary signal that could be written on a record carrier. In FIG. 1c is the write current with which the binary signal will be written on the record carrier. FIG. 1d is the mangetic pattern in a track on a record carrier in which the binary signal as given in (b) of FIG. 1 has been written. The binary signal in FIG. 2b has a sequence of bits . . . 00010 . . . The bit directly preceding the first '0' bit in was a '1' bit. This can be concluded from the fact that the magnetisation prior to the first pulse in the time interval $t_0,t_1$ is given by plus-signs, see FIG. 2d.

The first '0'-bit in the sequence of three consecutive '0'-bits shown in FIG. 2d results in the generation of two negative pulses $P_1'$ and $P_2'$ in the time interval $t_0,t_1$. The subsequent '0'-pulse leads to a positive pulse $P_3'$ followed by a negative pulse $P_4'$ in the time interval $t_1,t_2$. The last '0'-pulse in the sequence leads again to a positive pulse $P_5'$ followed by a negative pulse $P_6'$ in the time interval $t_2,t_3$. The subsequent '1'-pulse leads to two positive pulses $P_7'$ and $P_8'$ in the time interval $t_3,t_4$. Next, comes a '0'-pulse which again results in the generation of two negative pulses $P_9'$ and $P_{10}'$ in the time interval $t_4,t_5$.

The magnetisation directions in the track on the record carrier behave as shown in FIG. 2d and need no further explanation.

It should again be noted that the moment of occurrence of the pulse pairs $(P_1',P_2')$, $(P_7',P_8')$ and $(P_9',P_{10}')$ in their corresponding time intervals $(t_0,t_1)$, $(t_3,t_4)$ and $(t_4,t_5)$ respectively, are delayed compared to the moment of occurrence of the pulse pairs $(P_3',P_4')$ and $(P_5',P_6')$ in their corresponding time intervals $(t_2,t_3)$ and $(t_3,t_4)$ respectively.

Figure 3:
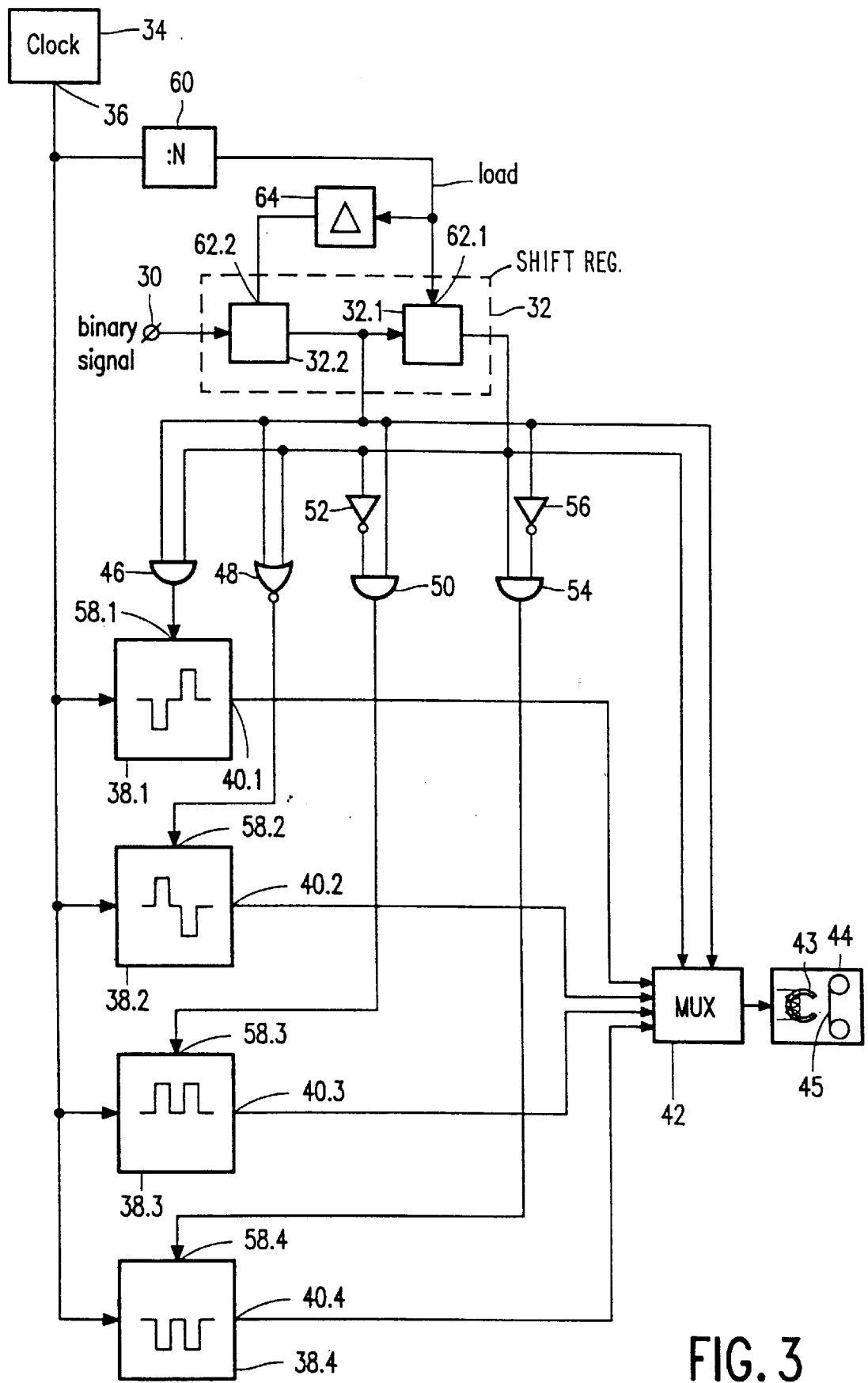
FIG. 3 shows an embodiment of the recording apparatus

FIG. 3 shows an embodiment of the recording apparatus. The apparatus has an input terminal 30 for receiving the binary signal. The binary signal could have been obtained by channel encoding an information signal. The binary signal thus can have the form of FIG. 1b or FIG. 2b where the binary signal is 'high' when being logic 'one', and 'low' when being logic 'zero'. The binary signal in FIG. 1b, is thus 'high' during the time interval from $t=t_0$ to $t=t_3$, 'low' during the time interval $(t_3,t_4)$ and again 'high' starting with the time instant $t_4$. The input terminal 30 is coupled to an input of a shift register 32 having two storage locations 32.1 and 32.2. A clock signal generator 34 is present having an output 36 for supplying the clock signal shown in FIG. 1a and FIG. 2a. This clock signal is supplied to a clock signal inputs of pulse generators 38.1 to 38.4. Further, the output of the clock signal generator 34 is coupled, via a frequency divider 60, to a load input 62.1 of the storage location 32.1 and further via a delay 64 to the load input 62.2 of the storage location 32.2. The frequency division by the divider 60 is such that in each time interval $(t_0,t_1)$, $(t_1,t_2)$, $(t_2,t_3)$, . . . a load pulse is generated. Such load pulse could be generated at the time instants $t_0$, $t_1$, $t_2$, $t_3$, . . . or eg. one clock pulse of the clock signal of FIG. 1a and FIG. 2a later. Outputs 40.1 to 40.4 of the generators 38.1 to 38.4 respectively are coupled to respective inputs of a multiplexer 42. An output of the multiplexer 42 is coupled to an input of a write unit 44. The write unit 44 comprises at least one write head 43 for writing the binary signal on a magnetic record carrier 45. The magnetic record carrier can be in the form of a longitudinal record carrier on which tracks are written in the longitudinal direction of the record carrier, or in a slant direction on the record carrier.

Outputs of the storage locations 32.1 and 32.2 are coupled to inputs of an AND gate 46 and to inputs of a NOR gate 48. Further, the outputs of the storage locations 32.1 and 32.2 are coupled to inputs of an AND gate 50 via an inverter 52 and to an AND gate 54 via an inverter 56. An output of the AND gate 46 is coupled to a trigger input 58.1 of the generator 38.1. An output of the NOR gate 48 is coupled to a trigger input 58.2 of the generator 38.2. An output of the AND gate 50 is coupled to a trigger input 58.3 of the generator 38.3. An output of the AND gate 54 is coupled to a trigger input 58.4 of the generator 38.4. Further, the outputs of the storage locations 32.1 and 32.2 are coupled to selection inputs of the multiplexer 42.

Consider the time instant $t_0$ in FIG. 1b, and that the '0'-bit preceding the '1'-bit of the time interval $(t_0,t_1)$ is stored in the storage location 32.2. At the time instant $t_0$, a load pulse is supplied by the divider 60. Thus, the '0'-bit stored in the location 32.2 is stored in the location 32.1. A delayed load pulse is supplied to the storage location 32.2, so that the first '1'-bit is loaded in the storage location 32.2. As a result, a 'high' output signal is supplied by the AND gate 50 so that the generator 38.3 is triggered to generate the positive pulses $P_1$ and $P_2$ in response to the clock signal and further timing signals (not further shown), such as e.g. a delayed version of the output signal of the delay unit 64, so that only a pulse pair is generated after the contents of the storage locations have their correct bit values. The 2-bit word supplied to the selection inputs of the multiplexer 42 controls the multiplexer to select the output of the generator 38.3 so that two positive pulses are supplied to the write unit 44.

At the time instant $t_1$, another load pulse is supplied by the divider 60. Thus, the '1'-bit stored in the location 32.2 is shifted into the location 32.1. A delayed load pulse is supplied to the storage location 32.2, so that the second '1'-bit is loaded in the storage location 32.2. As a result, a 'high' output signal is supplied by the AND gate 46 so that the generator 38.1 is triggered to generate the pulse pair ($P_3$, $P_4$). The 2-bit word supplied to the selection inputs of the multiplexer 42 controls the multiplexer to select the output of the generator 38.1 so that the pulse pair ($P_3$, $P_4$) is supplied to the write unit 44. At the time instant $t_2$, another load pulse is supplied by the divider 60. Thus, the '1'-bit stored in the location 32.2 is shifted into the location 32.1. A delayed load pulse is supplied to the storage location 32.2, so that the third '1'-bit is loaded in the storage location 32.2. As a result, again a 'high' output signal is supplied by the AND gate 46 so that the generator 38.1 is triggered again so as to generate the pulse pair ($P_5, P_6$). The 2-bit word supplied to the selection inputs of the multiplexer 42 controls the multiplexer to select the output of the generator 38.1 so that the pulse pair ($P_5, P_6$) is supplied to the write unit 44.

At the time instant $t_3$, another load pulse is supplied by the divider 60. Thus, the '1'-bit stored in the location 32.2 is shifted into the location 32.1. A delayed load pulse is supplied to the storage location 32.2, so that the '0'-bit is loaded in the storage location 32.2. As a result, a 'high' output signal is supplied by the AND gate 54 so that the generator 38.4 is triggered so as to generate the pulse pair ($P_7, P_8$). The 2-bit word supplied to the selection inputs of the multiplexer 42 controls the multiplexer to select the output of the generator 38.4 so that the pulse pair ($P_7, P_6$) is supplied to the write unit 44. The load pulse at the time instant $t_4$, supplied by the divider 60, results in storing the '0'-bit into the location 32.1 and the corresponding delayed load pulse results in loading a '1'-bit into the storage location 32.2. As a result, a 'high' output signal is supplied by the AND gate 50 so that the generator 38.3 is triggered so as to generate the pulse pair ($P_9, P_{10}$. The 2-bit word supplied to the selection inputs of the multiplexer 42 controls the multiplexer to select the output of the generator 38.3 so that the pulse pair ($P_9, P_{10}$) is supplied to the write unit 44.

In an equivalent way, the write current as shown in FIG. 2c can be generated. We assume that the '1'-bit preceding the '0'-bit of the time interval ($t_0, t_1$) is stored in the storage location 32.2. At the time instant $t_0$8, a load pulse is supplied by the divider 60. Thus, the '1'-bit stored in the location 32.2 is shifted into the location 32.1. A delayed load pulse is supplied to the storage location 32.2, so that the first '0'-bit of the sequence of three '0'-bits is loaded in the storage location 32.2. As a result, a 'high' output signal is supplied by the AND gate 54 so that the generator 38.4 is triggered to generate the negative pulses $P_1'$ and $P_2'$ in response to the clock signal and further timing signals (not further shown), such as e.g. a delayed version of the output signal of the delay unit 64, so that only a pulse pair is generated after the contents of the storage locations have their correct bit values. The 2-bit word supplied to the selection inputs of the multiplexer 42 controls the multiplexer to select the output of the generator 38.4 so that two negative pulses are supplied to the write unit 44.

At the time instant $t_1$, another load pulse is supplied by the divider 60. Thus, the '0'-bit stored in the location 32.2 is shifted into the location 32.1. A delayed load pulse is supplied to the storage location 32.2, so that the second '0'-bit is loaded in the storage location 32.2. As a result, a 'high' output signal is supplied by the NOR gate 48 so that the generator 38.2 is triggered to generate the pulse pair ($P_3', P_4'$). The 2-bit word supplied to the selection inputs of the multiplexer 42 controls the multiplexer to select the output of the generator 38.2 so that the pulse pair ($P_3', P_4'$) is supplied to the write unit 44. At the time instant $t_2$, another load pulse is supplied by the divider 60. Thus, the '0'-bit stored in the location 32.2 is shifted into the location 32.1. A delayed load pulse is supplied to the storage location 32.2, so that the third '0'-bit is loaded in the storage location 32.2. As a result, again a 'high' output signal is supplied by the NOR gate 48 so that the generator 38.2 is triggered again so as to generate the pulse pair ($P_5', P_6'$). The 2-bit word supplied to the election inputs of the multiplexer 42 controls the multiplexer to select the output of the generator 38.2 so that the pulse pair ($P_5', P_6'$) is supplied to the write unit 44.

At the time instant $t_3$, another load pulse is supplied by the divider 60. Thus, the '0'-bit stored in the location 32.2 is shifted into the location 32.1. A delayed load pulse is supplied to the storage location 32.2, so that the '1'-bit is loaded in the storage location 32.2. As a result, a 'high' output signal is supplied by the AND gate 50 so that the generator 38.3 is triggered so as to generate the pulse pair ($P_7', P_8'$). The 2-bit word supplied to the selection inputs of the multiplexer 42 controls the multiplexer to select the output of the generator 38.3 so that the pulse pair ($P_7', P_8'$) is supplied to the write unit 44. The load pulse at the time instant $t_4$, supplied by the divider 60, results in storing the '1'-bit into the location 32.1 and the corresponding delayed load pulse results in loading a '0'-bit into the storage location 32.2. As a result, a 'high' output signal is supplied by the AND gate 54 so that the generator 38.4 is triggered so as to generate the pulse pair ($P_9', P_{10}'$). The 2-bit word supplied to the selection inputs of the multiplexer 42 controls the multiplexer to select the output of the generator 38.4 so that the pulse pair ($P_9', P_{10}'$) is supplied to the write unit 44.

It will be clear that a person skilled in the art will perceive embodiments of the generators 38.1 to 38.4 very easily without any inventive ingenuity. Whilst the present invention has been described with respect to preferred embodiments thereof, it is to be understood that these are not limitative examples. Thus, various modifications may become apparent to those skilled in the art, without departing from the scope of the invention, as defined in the appended claims. As an example, the embodiments described show the generation of two pulses for each bit of the binary signal to be written. One could have chosen to generate more than two pulses for each bit of the binary signal, eg. three. More specifically, the signal as per FIG. 1c could have resulted in three positive pulses in the interval ($t_0, t_1$), one negative pulse followed by two positive pulses in each of the time intervals ($t_1, t_2$), ($t_2, t_3$), three negative pulses in the interval ($t_3, t_4$) and three positive pulses in the time interval ($t_4, t_5$).

We claim:

1. Method of recording a binary signal onto a magnetic record carrier, the method comprises the steps of:
   (a) receiving the binary signal, the binary signal comprising bits of a first polarity and bits of a second polarity, the second polarity being opposite to the first polarity,
   (b) writing bits of the first and the second polarity onto the record carrier, characterized in that the writing step comprises the step of generating at least two write pulses for each bit to be written, and that, when writing a first sequence of at least two bits of the first polarity followed by a second sequence of at least two bits of the second polarity, the writing step comprising the substeps of
      (i) generating at least two write pulses of a third polarity for the first bit of the first polarity in the first sequence,
      (ii) generating a write pulse of the third polarity and a write pulse of a fourth polarity for the at least second bit of the first polarity occurring in the first sequence, the third polarity being opposite to the fourth polarity,
      (iii) generating at least two write pulses of the fourth polarity for the first bit of the second polarity in the second sequence,
      (iv) generating a write pulse of the third polarity and a write pulse of the fourth polarity for the at least second bit of the second polarity occurring in the second sequence.

2. The method as claimed in claim 1, characterized in that the substep (ii) comprises generating a write pulse of the fourth polarity and a write pulse of a third polarity thereafter, for the at least second bit of the first polarity occurring in the first sequence.

3. The method as claimed in claim 2, characterized in that the substep (iv) comprises generating a write pulse of the third polarity and a write pulse of the fourth polarity thereafter, for the at least second bit of the second polarity occurring in the second sequence.

4. The method as claimed in claim 3, characterized in that the substep (i) further comprises delaying the at least two write pulses of the third polarity generated for the first bit of the first polarity in the first sequence.

5. The method as claimed in claim 4, characterized in that the substep (iii) further comprises delaying the at least two write pulses of the fourth polarity generated for the first bit of the second polarity in the second sequence.

6. The method as claimed in claim 1, characterized in that the substep (iv) comprises generating a write pulse of the third polarity and a write pulse of the fourth polarity thereafter, for the at least second bit of the second polarity occurring in the second sequence.

7. The method as claimed in claim 6, characterized in that the substep (i) further comprises delaying the at least two write pulses of the third polarity generated for the first bit of the first polarity in the first sequence.

8. The method as claimed in claim 1, characterized in that the substep (i) further comprises delaying the at least two write pulses of the third polarity generated for the first bit of the first polarity in the first sequence.

9. The method as claimed in claim 8, characterized in that the substep (iii) further comprises delaying the at least two write pulses of the fourth polarity generated for the first bit of the second polarity in the second sequence.

10. The method as claimed in claim 1, characterized in that the substep (iii) further comprises delaying the at least two write pulses of the fourth polarity generated for the first bit of the second polarity in the second sequence.

11. Apparatus for recording a binary signal onto a magnetic record carrier, the apparatus comprises:
    input means for receiving the binary signal, the binary signal comprising bits of a first polarity and bits of a second polarity, the second polarity being opposite to the first polarity,
    writing means for writing bits of the first and the second polarity onto the record carrier, characterized in that the writing means are adapted to generate at least two write pulses for each bit to be written, and that, for writing a first sequence of at least two bits of the first polarity followed by a second sequence of at least two bits of the second polarity, the writing means comprising
    generator means for
       (i) generating at least two write pulses of a third polarity for the first bit of the first polarity in the first sequence,
       (ii) generating a write pulse of the third polarity and a write pulse of a fourth polarity for the at least second bit of the first polarity occurring in the first sequence, the third polarity being opposite to the fourth polarity,
       (iii) generating at least two write pulses of the fourth polarity for the first bit of the second polarity in the second sequence,
       (iv) generating a write pulse of the third polarity and a write pulse of the fourth polarity for the at least second bit of the second polarity occurring in the second sequence.

12. The apparatus as claimed in claim 11, characterized in that the generator means are further adapted to generate a write pulse of the fourth polarity and a write pulse of a third polarity thereafter, for the at least second bit of the first polarity occurring in the first sequence.

13. The apparatus as claimed in claim 12, characterized in that the generator means are further adapted to generate a write pulse of the third polarity and a write pulse of the fourth polarity thereafter, for the at least second bit of the second polarity occurring in the second sequence.

14. The apparatus as claimed in claim 13, characterized in that the generator means further comprises delay means for delaying the at least two write pulses of the third polarity generated for the first bit of the first polarity in the first sequence.

15. The apparatus as claimed in claim 14, characterized in that the delay means are further adapted to delay the at least two write pulses of the fourth polarity generated for the first bit of the second polarity in the second sequence.

16. The apparatus as claimed in claim 12, characterized in that the delay means are further adapted to delay the at least two write pulses of the fourth polarity generated for the first bit of the second polarity in the second sequence.

17. The apparatus as claimed in claim 11, characterized in that the generator means are further adapted to generate a write pulse of the third polarity and a write pulse of the fourth polarity thereafter, for the at least second bit of the second polarity occurring in the second sequence.

18. The apparatus as claimed in claim 17, characterized in that the generator means further comprises delay means for delaying the at least two write pulses of the third polarity generated for the first bit of the first polarity in the first sequence.

19. The apparatus as claimed in claim 11, characterized in that the generator means further comprises delay means for delaying the at least two write pulses of the third polarity generated for the first bit of the first polarity in the first sequence.

20. The apparatus as claimed in claim 19, characterized in that the delay means are further adapted to delay the at least two write pulses of the fourth polarity generated for the first bit of the second polarity in the second sequence.

21. A method for recording a binary signal on a record carrier said method comprising:

provide a binary signal having bits of a first and second value; and generating at least two write pulses for each bit to be written;

said write pulses being arranged so that when a present bit to be written on said record carrier has the same value as the bit immediately preceding said present bit, said write pulses include a write pulse of a first polarity and a write pulse of a second polarity, said write pulses further being arranged so that when a present bit to be written on said record carrier has a different value as the bit immediately preceding said present bit, said write pulses are all of the same polarity.

* * * * *